US010865882B2

(12) United States Patent
Lutaud et al.

(10) Patent No.: US 10,865,882 B2
(45) Date of Patent: Dec. 15, 2020

(54) SEALING DEVICE, NOTABLY WITH REGARD TO CONTAMINATION BY EXTERNAL AGENTS

(71) Applicant: CARL FREUDENBERG KG, Weinheim (DE)

(72) Inventors: Charlie Lutaud, Orbigny au Mont (FR); Olivier Forte, Bar sur Aube (FR); Dominique Lutaud, Auberive (FR)

(73) Assignees: CARL FREUDENBERG KG, Weinheim (DE); FREUDENBERG SAS, Langres (FR)

( * ) Notice: Subject to any disclaimer, the term of this patent is extended or adjusted under 35 U.S.C. 154(b) by 101 days.

(21) Appl. No.: 16/070,461

(22) PCT Filed: Feb. 9, 2017

(86) PCT No.: PCT/EP2017/052818
§ 371 (c)(1),
(2) Date: Jul. 16, 2018

(87) PCT Pub. No.: WO2017/137475
PCT Pub. Date: Aug. 17, 2017

(65) Prior Publication Data
US 2019/0017602 A1 Jan. 17, 2019

(30) Foreign Application Priority Data
Feb. 9, 2016 (FR) ...................... 16 51017

(51) Int. Cl.
*F16J 15/3228* (2016.01)
*F16J 15/16* (2006.01)
*F16J 15/3264* (2016.01)

(52) U.S. Cl.
CPC ......... *F16J 15/3228* (2013.01); *F16J 15/164* (2013.01); *F16J 15/3264* (2013.01)

(58) Field of Classification Search
CPC .. F16J 15/3228; F16J 15/3244; F16J 15/3256; F16J 15/164; F16J 15/3264
See application file for complete search history.

(56) References Cited

U.S. PATENT DOCUMENTS 4,746,128 A * 5/1988 Freiwald ............. F16J 15/3264
277/349
4,928,979 A * 5/1990 Nagasawa ........... F16J 15/3264
277/348
(Continued)

FOREIGN PATENT DOCUMENTS

CN 202469005 U 10/2012
DE 10259400 A1 7/2004
(Continued)

OTHER PUBLICATIONS

International Search Report, dated Apr. 10, 2017, from corresponding PCT application No. PCT/EP20171052818.

*Primary Examiner* — Gilbert Y Lee
(74) *Attorney, Agent, or Firm* — Nixon & Vanderhye

(57) ABSTRACT

Disclosed is a sealing device for a rotary shaft, including a seal mounted fixedly in a passage through which the shaft passes, providing a sealed barrier and consisting of a bearing ring with an external axial flange and a radial flange, and a sealing washer attached to the bearing ring, surrounds the axial flange and extends inward along that face of the radial flange that faces toward the outside, to end in a sealing lip bearing slidingly against the rotary shaft to be sealed, the sealing device also including a protective unit protecting against contaminants. The protective unit includes an additional ring which is secured to the rotary shaft, which is positioned on the exterior side of the seal, and which includes a radial flange which, in collaboration with the (Continued)

radial flange of the bearing ring of the seal, forms an annular structure of the chicane or labyrinth type.

20 Claims, 12 Drawing Sheets

(56) References Cited

U.S. PATENT DOCUMENTS

| | | |
|---|---|---|
| 9,388,904 B2 | 7/2016 | Girardot et al. |
| 9,851,010 B2 | 12/2017 | Humblot et al. |
| 2009/0166977 A1 | 7/2009 | Lutaud et al. |
| 2010/0194054 A1* | 8/2010 | Nishigaki ............ F16J 15/3256 277/549 |
| 2013/0200575 A1 | 8/2013 | Humblot et al. |
| 2015/0285380 A1 | 10/2015 | Nakagawa |

FOREIGN PATENT DOCUMENTS

| | | |
|---|---|---|
| DE | 10 2015 210017 A1 | 1/2016 |
| EP | 2 044 351 B1 | 12/2012 |
| EP | 2 913 566 A1 | 9/2015 |
| EP | 2 739 885 B1 | 8/2016 |
| EP | 2 895 773 B1 | 12/2016 |
| FR | 2 927 395 A3 | 8/2009 |
| FR | 2 986 598 A1 | 8/2013 |
| GB | 2123498 A | 2/1984 |

\* cited by examiner

ABSTRACT

SEALING DEVICE, NOTABLY WITH REGARD TO CONTAMINATION BY EXTERNAL AGENTS

This invention relates to the field of equipment for installations, machines, vehicles or the like comprising a rotary or turning part, such as a shaft or a pin, which part has to be sealed in the area of an opening, a passage, a bearing or the like.

More specifically, this invention has as its object an improved sealing device, in particular with regard to contamination by external agents.

Within the context of rotary turning parts, such as, for example, a shaft or a pin exiting from a crankcase or a shaft that is borne and guided into a bearing, the sealing between the internal environment to be protected, in which a lubricating fluid generally resides, and the external environment is commonly produced by a circular static joint of which at least one flexible lip is supported in such a way as to slide on the shaft. Such joints are known by, for example, the documents FR 2 986 598, EP 2 044 351, EP 2 895 773 and EP 2 739 885.

However, for the environments that are loaded in particular with agents, substances and materials that pollute the internal environment that is to be protected, it is also known to combine with the joint devices of the above-cited type sealing elements or additional protective means for the purpose of protecting the shaft passage and the sealing joint in place (sealing for the internal fluids) against external contaminants (water, mud, dust, . . . ).

By way of examples of such known additional elements and means, it is possible to mention stationary dust-shield lips (without contact, but with the presence of a gap that allows the contaminants to pass near the surface of the shaft), and labyrinth lip joints, generally made of non-woven fibers (in contact with the rotary shaft, therefore significant losses through friction).

Means that form a fan or blower in the form of a specific wheel with flanges mounted on the rotary shaft, upstream and at a distance from the joint, to push contaminants back by creating a stream of exhaust air are also known (see, for example: GB 2123498, CN 202469005).

In the various cases mentioned above, it is a matter of specific additional structures neither interacting nor cooperating with the joint in place and in contrast bringing about significant additional expense, space requirement, weight and structural complexity.

With regard to the limitations above of the state of the art, the invention has as its essential object to provide a combined solution of sealing and protection against contaminants, which is high-performing, simple, inexpensive, and which at most generates only small losses.

For this purpose, the invention has as its object a sealing device for a rotary shaft or pin, comprising a sealing joint mounted in a stationary manner in a passage or an opening through which said shaft or pin passes, providing an airtight barrier between an internal environment and an external environment and consisting, on the one hand, of a support body in the form of a bearing ring with an external axial flange and a radial flange, preferably with an L-shaped cross-section, and, on the other hand, of a sealing washer that is attached to the bearing ring, surrounds the axial flange on the outside circumference of said ring, and extends toward the inside, in the direction of the rotary shaft or pin that is to be sealed, along the face of the radial flange that faces toward the external environment, to end in a sealing lip that extends beyond the inside edge of the radial flange and is supported in such a way as to slide on said shaft or pin, with said sealing device also comprising an additional means for protection against external contaminants, in particular of the dust, water or mud type, sealing device characterized in that the additional means for protection against external contaminants comprises an additional ring that is integral with the rotary shaft or pin, which is placed on the outer side in relation to the sealing joint and which comprises a radial flange that forms—by cooperation with the radial flange of the bearing ring of the sealing joint—an annular structure with baffles or that is a labyrinth, and in that the face of the radial flange of the additional ring, facing toward the sealing joint, is in intermittent or localized, preferably linear, sliding contact with the part of the sealing washer that covers the radial flange of the bearing ring of the sealing joint, with the above-mentioned part of the sealing washer comprising on the surface at least one structure in relief and/or recessed that comes into contact, at least under a slight pressure, with a flat zone that corresponds to the face opposite to the radial flange of the additional ring, and/or the face in question of the radial flange of the additional ring that comprises on the surface at least one structure in relief and/or recessed coming into contact, at least under a slight pressure, with a flat zone of the face opposite to the part of the washer that covers the radial flange of the bearing ring.

The invention will be better understood, owing to the description below, which relates to preferred embodiments, provided by way of non-limiting examples and explained with reference to the accompanying diagrammatic drawings, in which.

Figure 1:
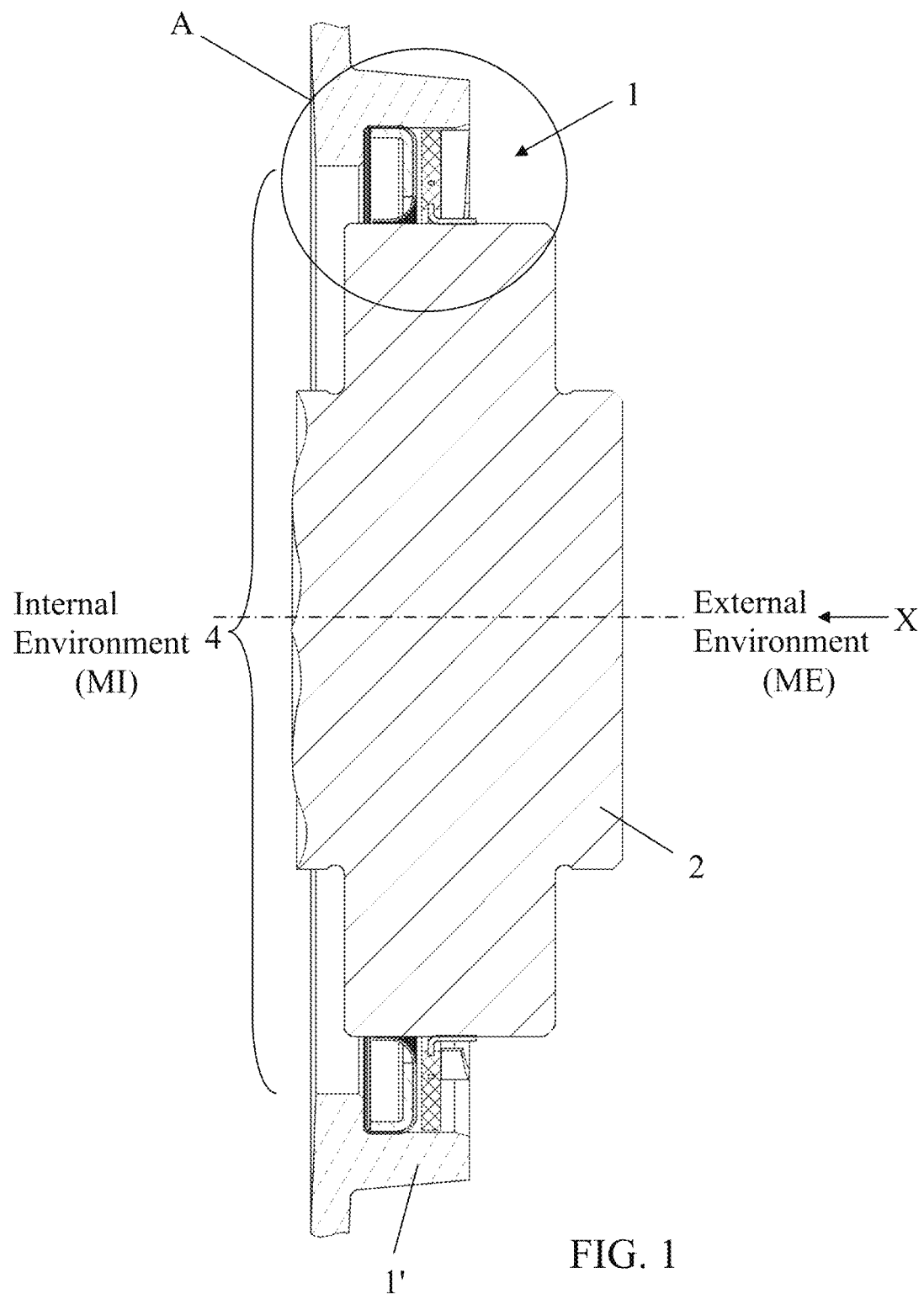
FIG. 1 is a partial cutaway view, along a plane that contains the axis of rotation, of a shaft that passes through an opening, with a sealing device according to the invention (shown diagrammatically) being arranged between the shaft and the passage of the opening.
Figure 6A:
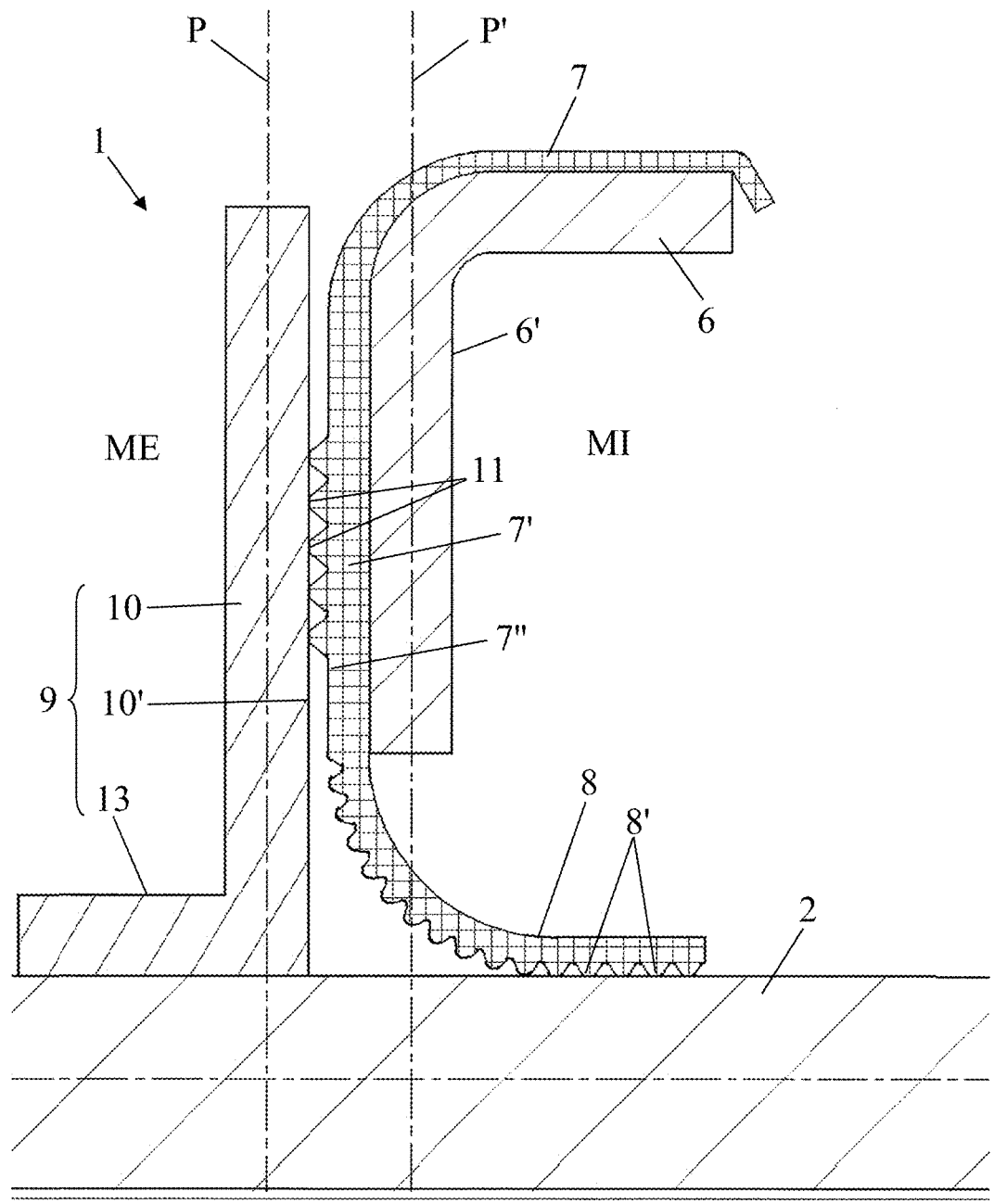
Figure 6B:
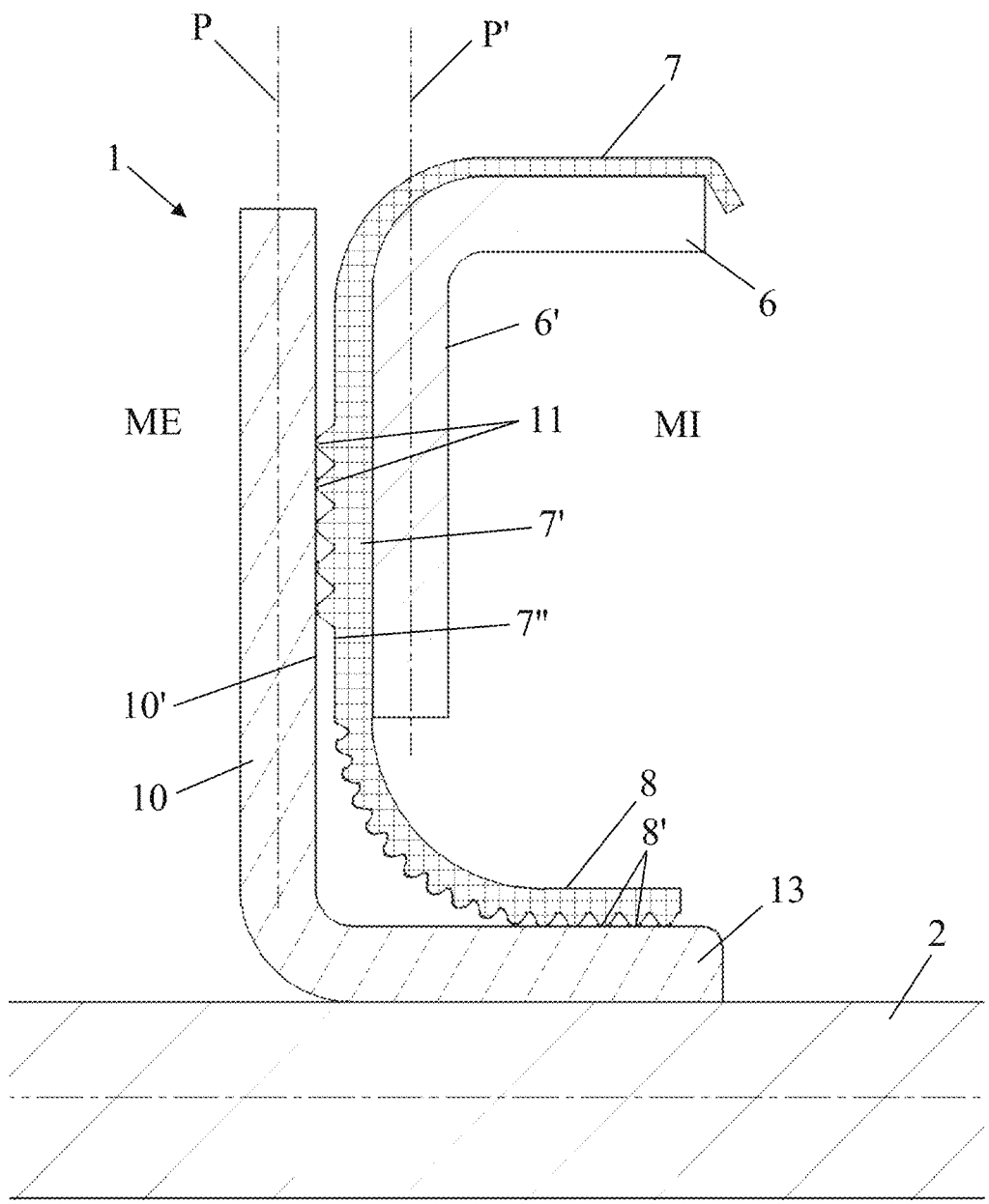
Figure 7A:
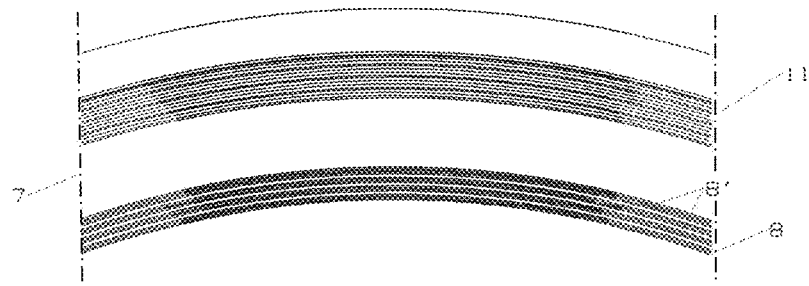
Figure 7B:
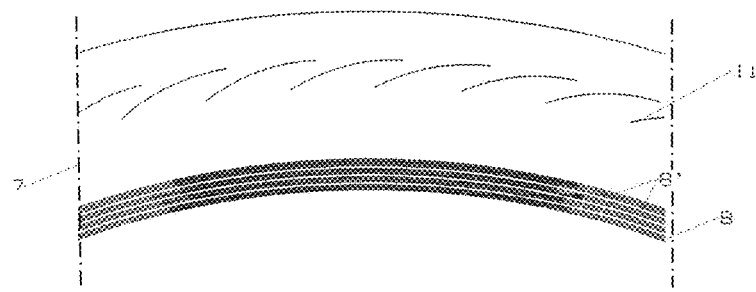

FIGS. 6A and 6B are frontal elevation views of the detail A of FIG. 1, each illustrating a different variant of a fourth embodiment of the sealing device according to the invention (the sealed passage not being shown), and FIGS. 7A and 7B are diagrammatic and partial views in flat elevation of the structured face of two variant embodiments of a sealing washer that is designed to be attached to a support ring of a joint device according to the invention.

FIGS. 1 to 6 show a sealing device 1 for a rotary shaft or pin 2, comprising a sealing joint 3 that is mounted in a stationary manner in a passage or an opening 4 through which said shaft or pin passes, providing an airtight barrier between an internal environment and an external environment (see FIG. 1).

This delimitation between internal environment MI and external environment ME results in, for example, the presence of a wall of crankcase 1' in which the passage 4 is made.

This joint 3 consists, on the one hand, of a support body 5 in the form of a bearing ring with an external axial flange 6 and a radial flange 6', therefore preferably with an L-shaped cross-section, and, on the other hand, of a sealing washer 7 that is attached to the bearing ring 5, surrounds the axial flange 6 on the external circumference of said ring 5, and extends toward the inside, along the face of the radial flange 6' that faces toward the outside, to end in a sealing lip 8 that is supported in such a way as to slide on the rotary shaft or pin 2 to be sealed.

This sealing device 1 also comprises means for protection against external contaminants, in particular of the dust, water or mud type.

In accordance with the invention, the means 9 for protection against external contaminants comprises an additional ring that is integral with the rotary shaft or pin 2, which is placed on the outer side in relation to the sealing joint 3 and which comprises a radial flange 10 that forms—by cooperation with the radial flange 6' of the bearing ring 5 of the sealing joint 3—an annular structure with baffles or that is a labyrinth.

Thus, owing to a simple technical measure, the invention makes it possible to provide a rotary protective screen 9 that covers the joint 3 on the outside and that is effective against contaminants, solid and liquid in particular, not only because of its sole obstructive presence but also because of its close cooperation with the joint 3 and the passage 4.

In an advantageous manner, the additional ring 9 that forms an annular deflector is mounted in an airtight manner on the rotary shaft or pin 2. In addition, its radial flange 10 extends preferably radially toward the outside to a short distance from the inner face 4' of the passage of the opening 4, preferably in a plane P that is parallel to the plane P' that contains the radial flange 6' of the sealing joint 3.

Such an arrangement decreases in particular the advancement of external contaminants toward the joint 3 by preventing any introduction of contaminants along the surface of the shaft or pin 2 and by very greatly limiting—and even actively combating—the introduction of such contaminants along the inner face 4' of the passage or the circular opening 4 (the distance from the latter and the external circular circumference of the annular flange 10 being advantageously less than 1 mm, preferably on the order of several hundredths to several tenths of millimeters).

The face 10' of the radial flange 10 can, of course, be located at a short distance from the joint 3, without contact with the radial flange 6' of the ring 5 that is covered by the washer 7.

An annular interstitial volume 15 that contains an air gap is then created.

However, in accordance with the invention, and as FIGS. 3 to 6 show, it is provided that the face 10' of the radial flange 10 of the additional ring 9, facing toward the sealing joint 3, is in intermittent or localized, preferably linear, sliding contact with the part 7' of the sealing washer 7 that covers the radial flange 6' of the bearing ring 5 of the sealing joint 3.

Owing to this arrangement, additional sealing is carried out between the additional ring 9 and the sealing joint 1, which blocks access to the critical dynamic sealing region that consists of the contact zone that slides between the sealing lip 8 and the surface of the rotary shaft or pin 2, against which it rests.

In addition, this arrangement of the invention also makes it possible, within the context of a joint 3 as mentioned above, and disclosed by, for example, the filings FR 2 986 598, EP 2 044 351 and EP 2 739 885 in the name of the applicant, to exploit advantageously the part 7' of the washer 7, not used before then within a sealing context or as a barrier function in the state of the art.

In addition, by providing a preferably linear, or at least intermittent, contact zone, the losses that are due to friction are limited, in particular when the materials in contact make it possible to achieve a small friction coefficient.

In accordance with a first variant embodiment of the invention, illustrated in, for example, FIGS. 6A and 6B, the part 7' in question—sealing washer 7—comprises on the surface at least one structure 11 in relief and/or recessed, coming into contact, at least under a slight pressure, with a corresponding flat zone of the face 10' opposite the radial flange 10 of the additional ring 9.

Figure 4A:
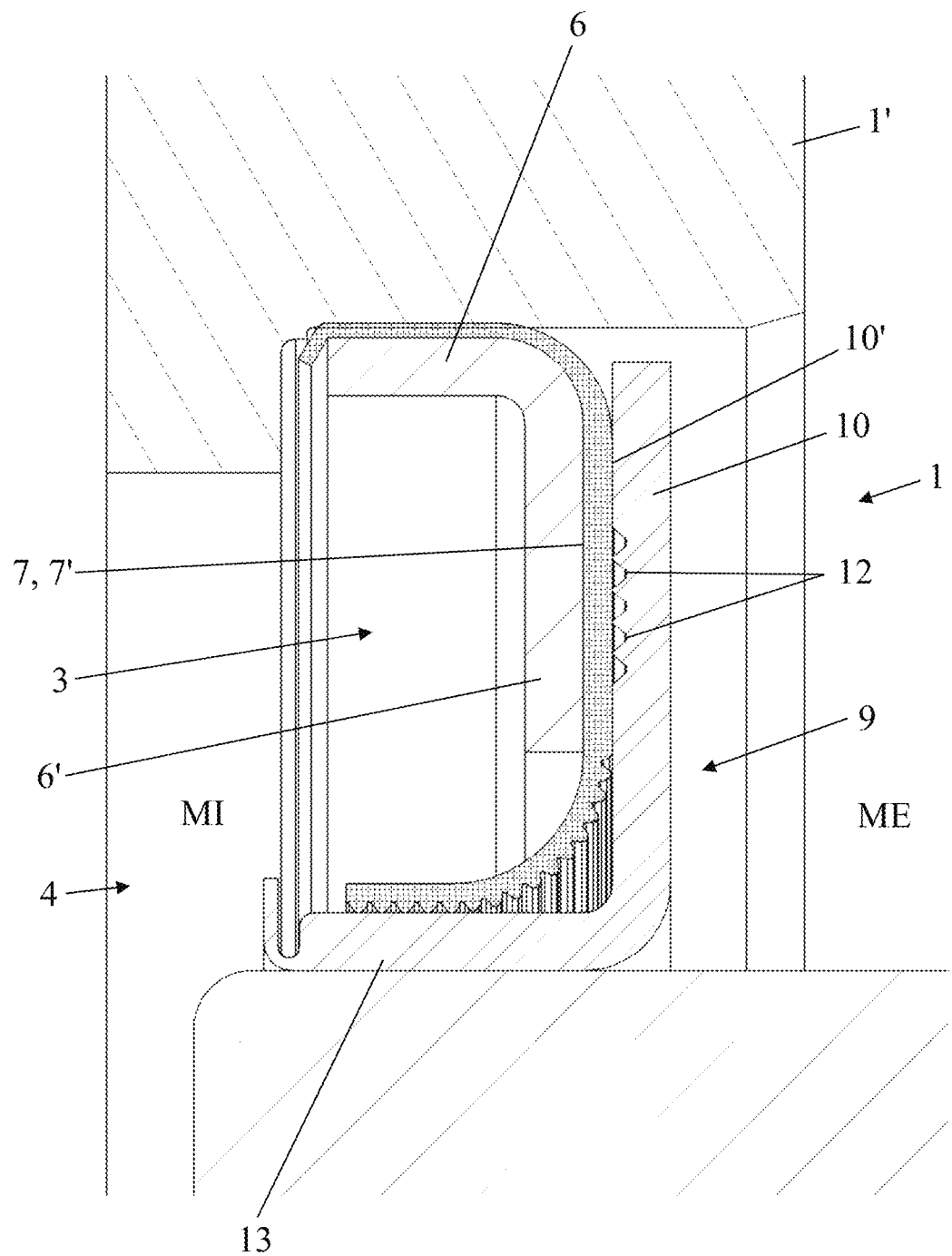
FIGS. 4A and 4B are views, on a different scale, of the detail A of FIG. 1, showing a second embodiment of the joint device according to the invention, respectively in frontal elevation (FIG. 4A) and in perspective (FIG. 4B)
Figure 4B:
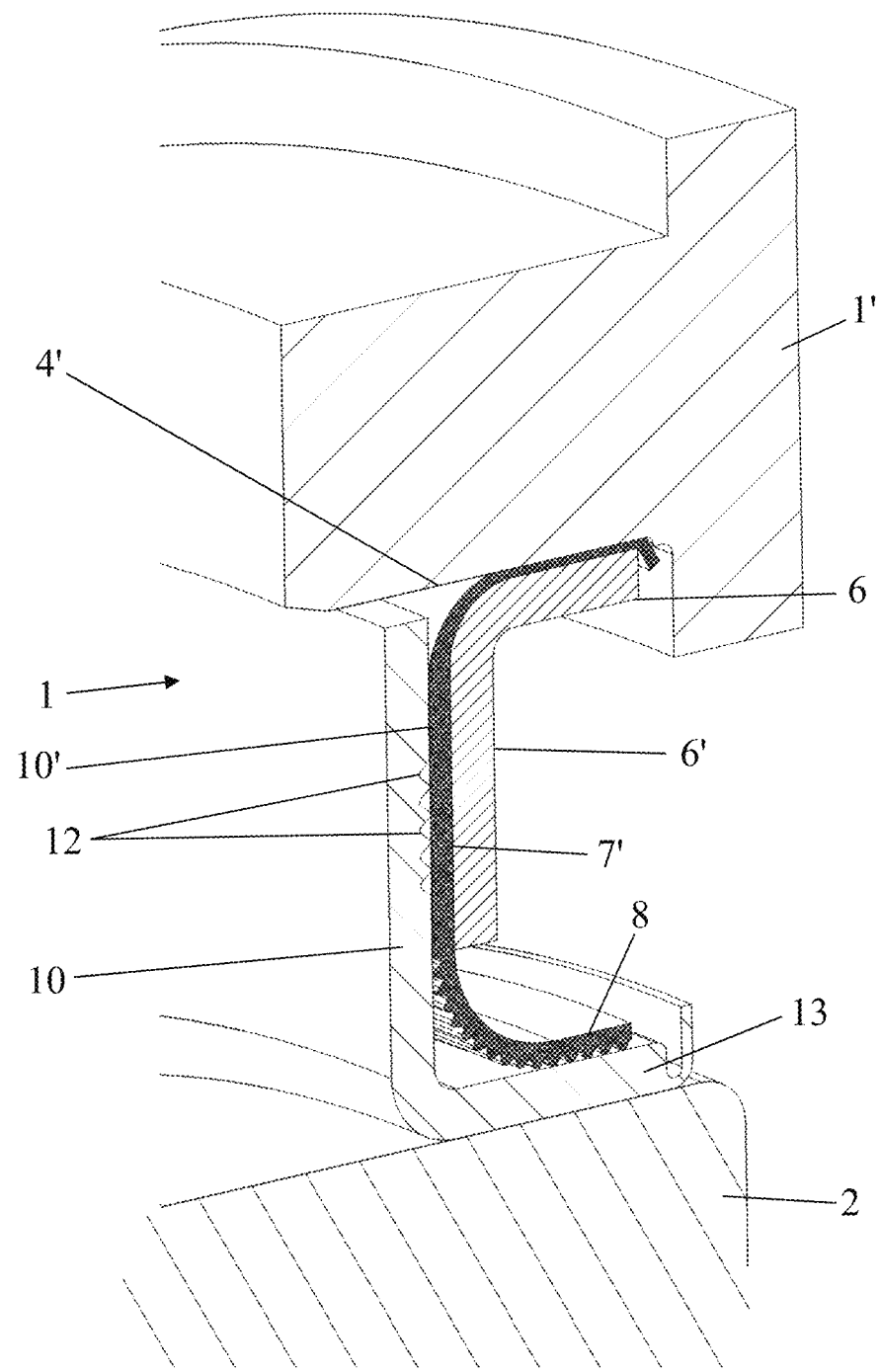
Figure 5A:
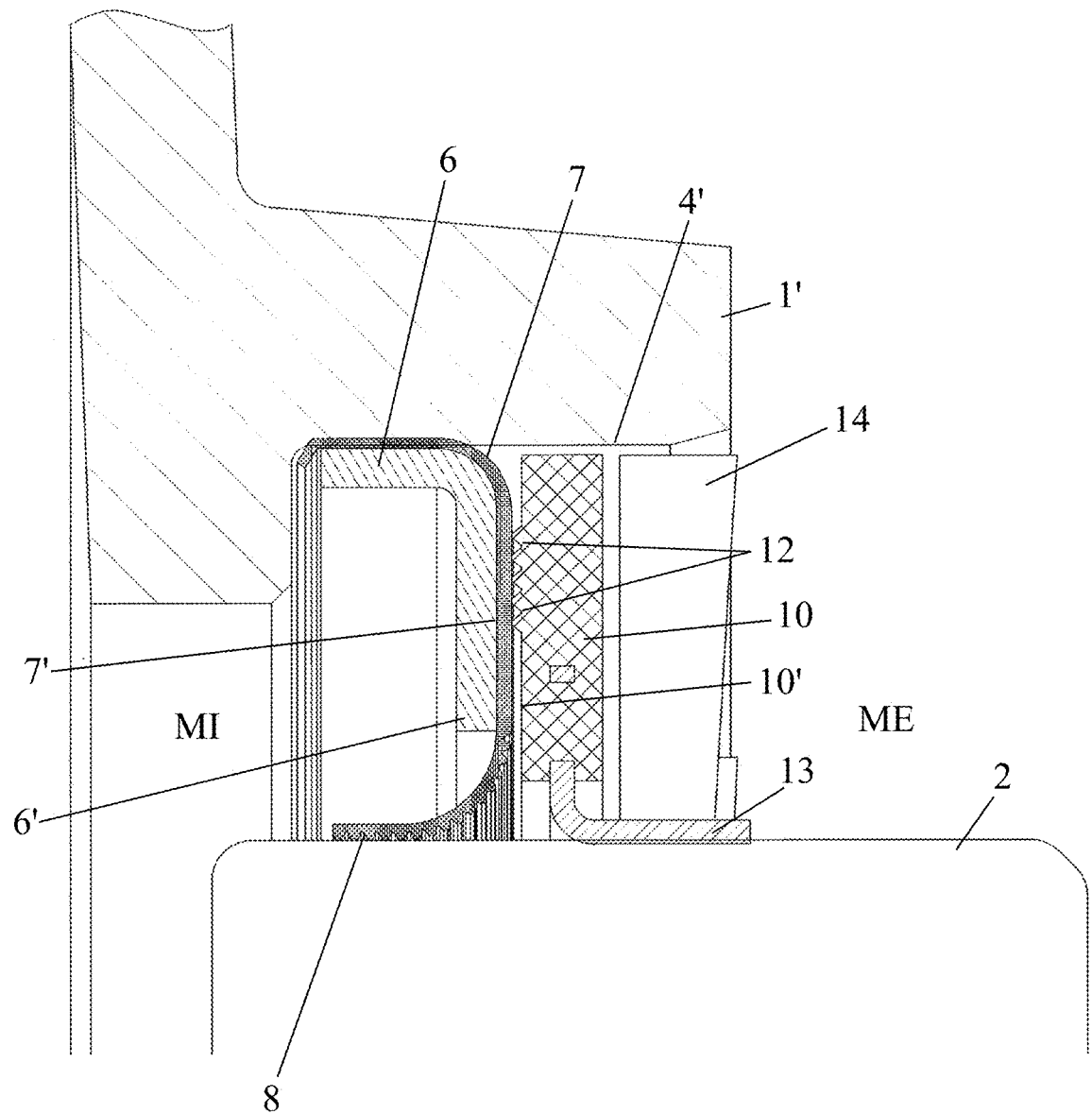
FIGS. 5A and 5B are views, on a different scale, of the detail A of FIG. 1, showing a third embodiment of the joint device according to the invention, respectively in frontal elevation (FIG. 5A) and in perspective (FIG. 5B)
Figure 5B:
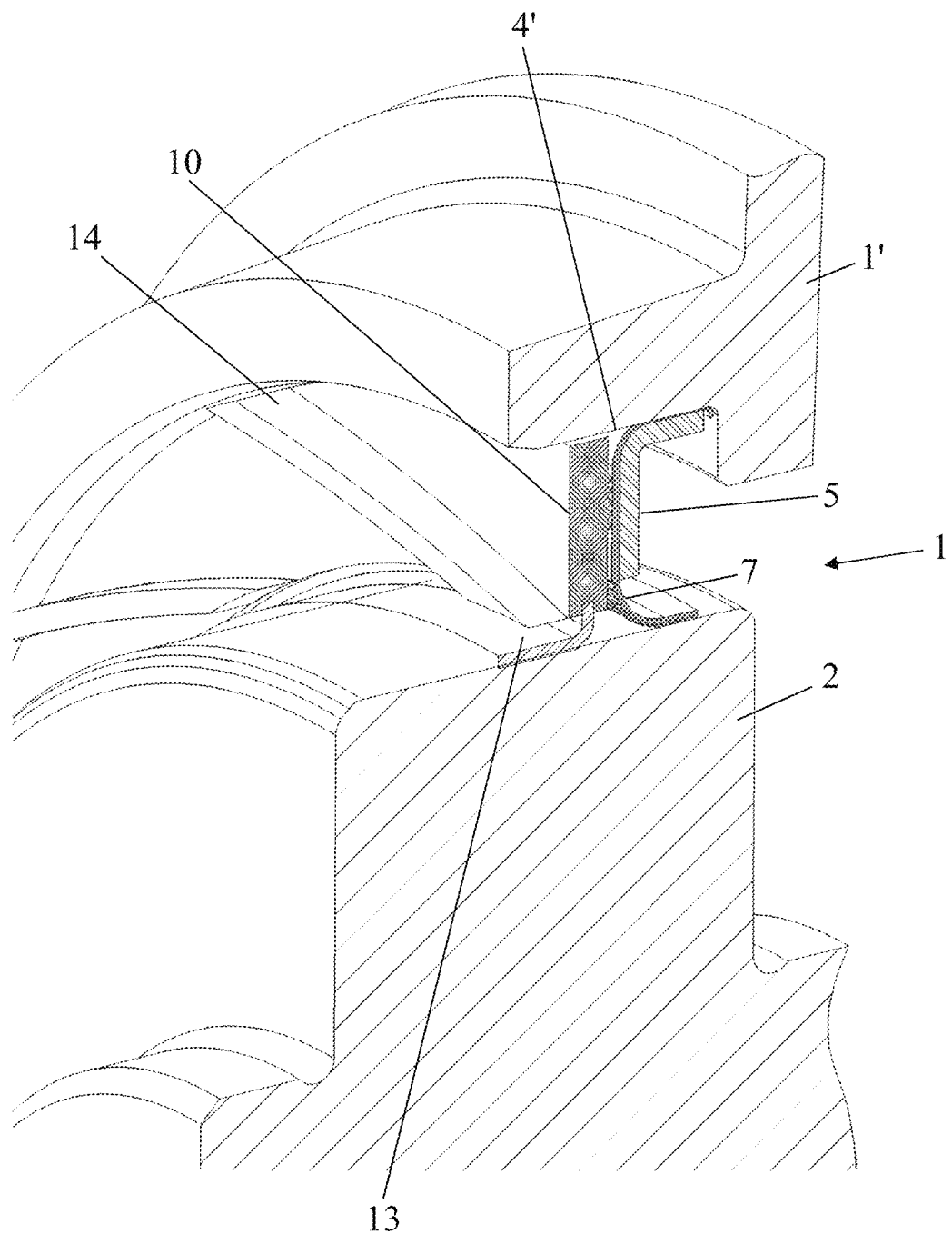

In accordance with a second variant embodiment of the invention, whose two alternatives are shown in FIGS. 4 and 5, the face 10' in question of the radial flange 10 of the additional ring 9 comprises on the surface at least one structure 12 in relief (FIG. 5) and/or recessed (FIG. 4) that comes into contact, at least under a slight pressure, with a flat zone of the face 7" opposite to the part 7' of the washer 7 that covers the radial flange 6' of the bearing ring 5.

This or these structures can come from molding or be obtained by shaping or stamping.

When they are formed recessed (FIG. 4), these are the parts of structures 11, 12 that remain flush with the surface of the flange 10 or the washer 7 that constitute the contact zones (they are then advantageously level with the surface zones that are not structured and are also in contact).

The two above-mentioned arrangements can also be implemented simultaneously and cumulatively.

Figure 3A:
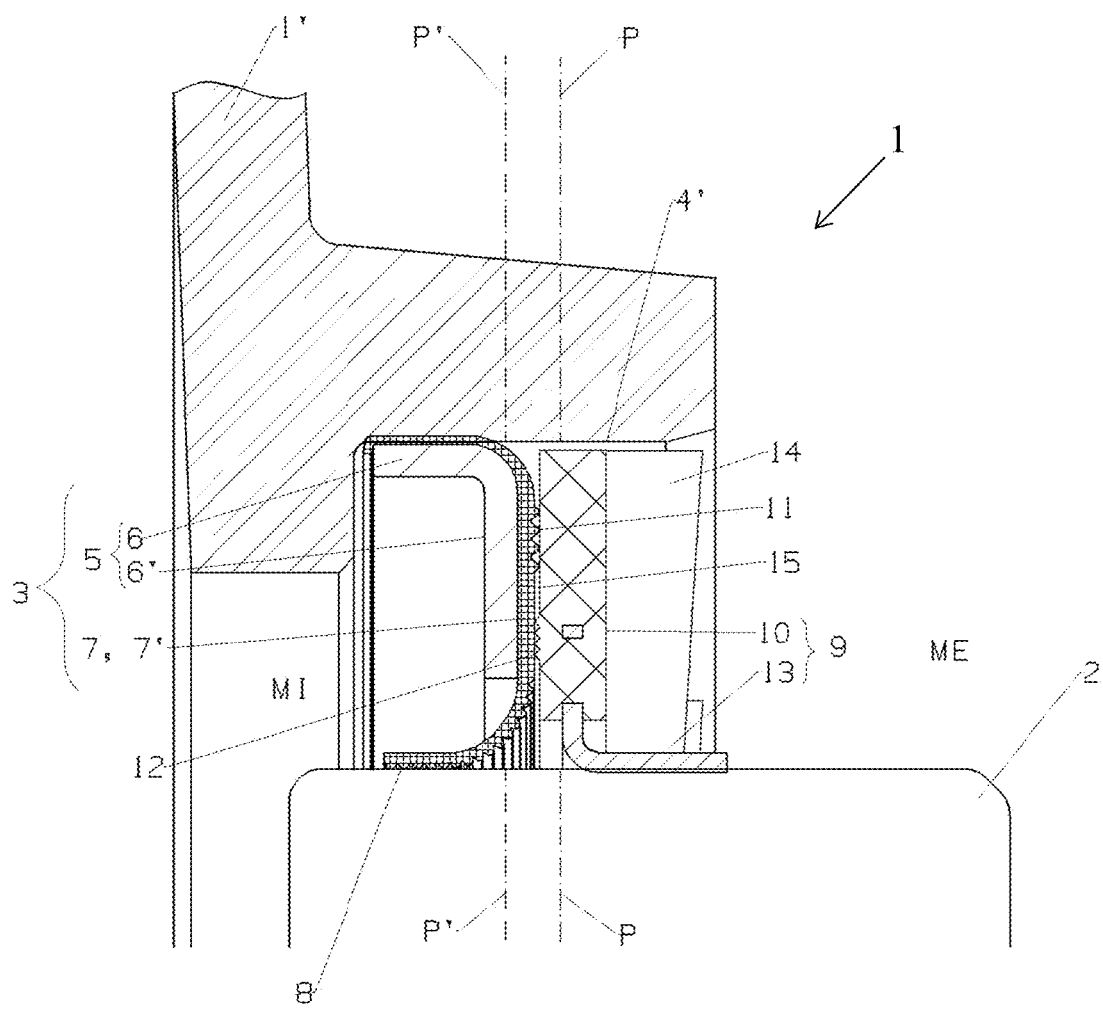
FIGS. 3A and 3B are views, on a different scale, of the detail A of FIG. 1, showing two variants of a first embodiment of the joint device according to the invention.

In this case, and according to an embodiment of the invention that combines the two above-mentioned variants and is shown in FIG. 3A, by way of example, it may be provided that structures in relief and/or recessed 11, 12 are provided on the part 7' of the sealing washer 7 in question and on the radial flange 10 of the additional ring 9, with the two structures 11 and 12 being located in separate annular circumferential regions, not overlapping, located at various distances around the rotary shaft or pin 2.

Of course, various configurations and shapes can be considered for the two types of structure(s) 11 and 12 in relief.

Thus, an integral structure or many separate structures, arranged according to a specified pattern, can be provided. Likewise, the cross-section of the trace (rib, groove) of the structure may or may not be constant and have shapes favoring a limited contact zone (for example: semi-circular, triangular, or rectangular cross-section, carved in a small width).

In accordance with a practical variant embodiment, the or at least one of the structure(s) 11, 12 in relief and/or recessed consists of a spiral (helical). The direction of winding from the outside to the inside of this spiral corresponds to the direction of rotation of the rotary shaft or pin 2, for a structure 12 on the ring 9, and in the anti-rotational direction for a structure 11 on the washer 7.

Thus, the direction of rotation of the trace of the spiral of a structure 11 that is part of the washer 7, from the inside to the outside, is identical to the direction of rotation of the shaft or the pin 2. For a structure 12, the direction is opposite.

During the rotation, such a structure 11 or 12 generates a centrifugal ejection action, in addition to its multi-layer barrier function.

According to another variant embodiment, in accordance with a fragmented design of the structures 11 and/or 12, the or at least one of said structures 11, 12 in relief or recessed consists of an annular arrangement of individual blades or grooves that are oriented and mutually partially overlap between adjacent blades or grooves of the arrangement.

In accordance with another practical variant embodiment, not specifically carrying out an ejection action, the or at least one of the structure(s) in relief and/or recessed 11, 12 consists of a pattern of at least two concentric circular ribs or grooves (obtaining multiple successive barriers in the radial direction).

Figure 3B:
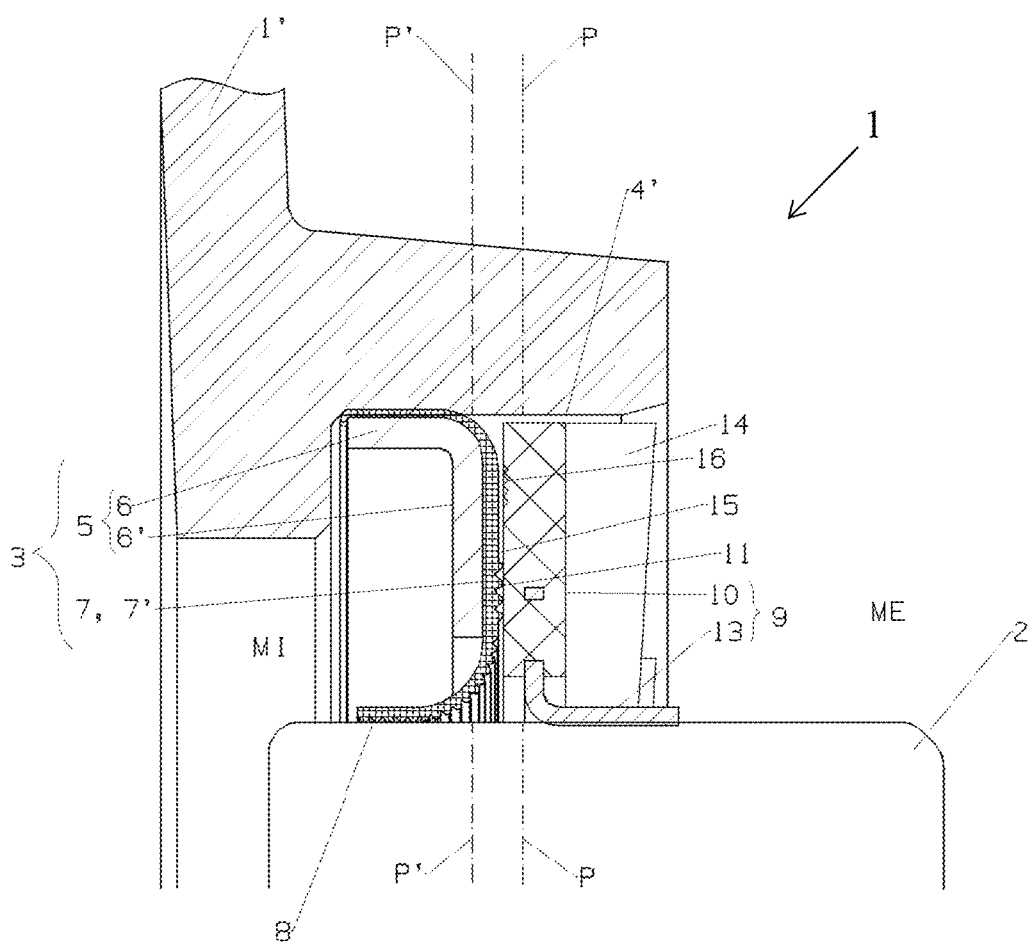

In addition to the structure or structures 11, 12 mentioned above, or alternately in relation to the latter, it may be provided that the radial flange 10 of the additional ring 9 comprises, on its face 10' located opposite and at a distance from the radial flange 6' of the bearing ring 5 covered by the sealing washer 7, one or more formations 16 in relief and/or recessed that can generate, during the rotation of the shaft 2 and therefore of the additional ring 9, a centrifugal air stream in the interstitial space 15 between the sealing joint 1 and said additional ring 9 (see FIG. 3B). This or these formation(s) 16 can, for example, have shapes that are similar to those of the structures 11 and 12 (blades, spirals, . . . ).

Structures 11, 12 performing the two functions (barrier and generating the air stream), i.e., partially in contact with the opposite face, can also be provided.

In addition, the part 7' of the washer 7 can comprise, located at various distances from the pin or the shaft 2, at least two separate formations 11 that may or may not be of the same type. As a variant, the face 10' of the radial flange 10 of the ring 9 can comprise at least two separate formations 12, which may or may not be of the same type, having different annular diameters.

The sealing lip 8, for producing the dynamic sealing, is normally applied directly to the rotary shaft or pin 2, preferably by a face of its free end that is equipped with a conveyor structure (see, by way of embodiment, the document FR 2 986 598), as FIGS. 3, 5 and 6A show.

As a variant, this lip 8 can also be applied against an element that is attached to said shaft or pin 2.

As FIG. 6B and FIG. 4 show, the axial flange 13, sealed airtight around and against the rotary shaft or pin 2, can provide an axially-limited outer jacketing of the latter, with said axial flange 13 extending along said shaft or pin 2 beyond the plane P' that contains the radial flange 6' of the bearing ring 5 and forming the sliding support surface for the sealing lip 8 of the sealing joint 1.

In the two above-mentioned variants, it may thus be provided that at least the face of the part of the sealing lip 8 that rests in a flexible manner on the shaft 2 or on the axial flange 13 of the additional ring 9 comprises a conveyor structure 8', for example with a sawtooth profile in cross-section and with a helical extension around the internal circumference of the sealing washer 8.

The winding direction of the spiral 8' that is formed by the conveyor structure is identical to that of the formations 11 of the washer 7.

For the purpose of producing additionally a dynamic conveyor or repelling action upstream from the protective means 9 and of providing an active sealing by air circulation between the latter and the passage or the opening 4, the additional ring 9 can comprise—preferably on the face of its radial flange 10 opposite to the sealing joint 7 or facing toward the outside and/or on the outside circumference of this flange 10—many formations 14, in relief or recessed, preferably distributed circumferentially in a homogeneous manner.

Figure 2A:
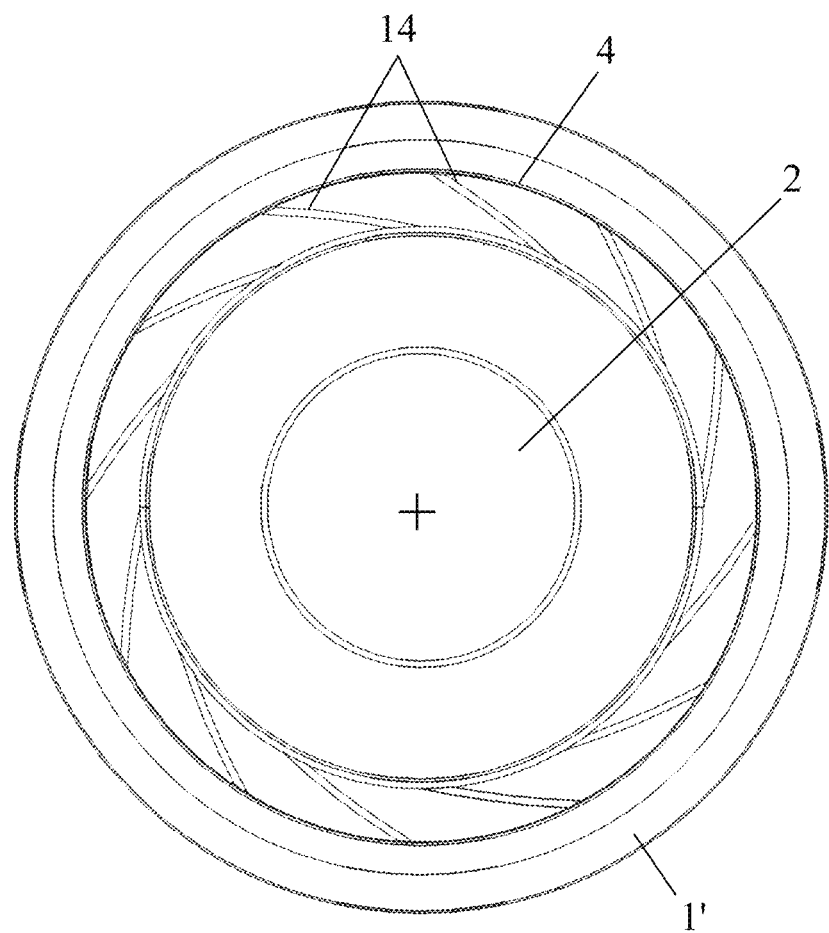
FIG. 2A is an elevation view in the direction X, parallel to the axis of rotation of the object that is shown in FIG. 1.
Figure 2B:
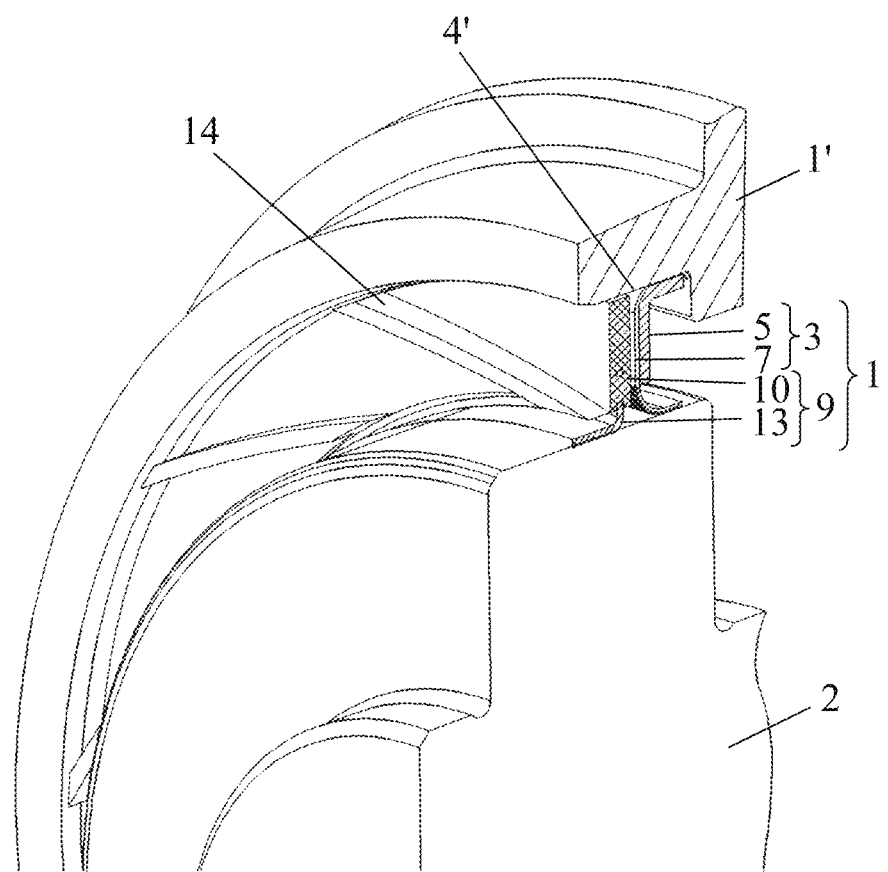
FIG. 2B is a partial cutaway and perspective view, on a different scale, of the sealing device of FIGS. 1 and 2A.

These formations 14, illustrated in, for example, FIGS. 2, 3 and 5, are able and designed to generate an air stream during the rotation of the shaft or pin 2, advantageously a vortex that is oriented in such a way as to oppose the introduction of external contaminants into the gap between said additional ring 9 and the inner face 4' of the wall of the passage or of the opening 4.

As FIGS. 2, 3 and 5 of the accompanying drawings show, these formations 14 can, for example, consist of fins. However, a single formation, such as a helical spiral, which is able to generate the repelling air stream, can also be considered. In addition, the leading edge of the opening or the passage 4, facing toward the external environment, can optionally have a specific conformation or configuration that works with the shaping or orientation of the stream of generated air.

The invention also relates to the embodiments of the device 1 combining two or more embodiments and variant embodiments mentioned above and compatible with one another, although not shown in the accompanying drawings.

In an advantageous manner, the sealing washer 7 is made of PTFE (polytetrafluoroethylene), making possible a sliding contact with a very slight friction and not requiring any lubrication (therefore adapted to high rotating speeds), and the bearing ring 5 is made of HLE-type sheet metal.

The additional ring 9 can, for example, as the figures show, consist of two parts, namely a metal annular base (sheet metal) forming the axial flange 13 and tightly interlocked on the shaft 2 and an annular disk made of a plastic material that forms the radial flange 10, cast onto the base and comprising the possible structures 12 and formations 14, preferably obtained from molding.

The sheet metal that forms each of the rings 5 and 9 can be steel that is machined or stamped in various strip qualities (DCO4 and HLE, for example), made of stainless steel or steel coated with an anti-corrosion treatment.

Of course, the invention is not limited to the embodiments described and shown in the accompanying drawings. Modifications are possible, in particular from the standpoint of the composition of the various elements or by substitution of equivalent techniques, without thereby exceeding the field of protection of the invention.

The invention claimed is:

1. A sealing device (1) for a rotary shaft (2) that passes through an opening (4), the sealing device (1) comprising:
   a sealing joint (3) mounted in a stationary manner in the opening (4) through which said rotary shaft (2) passes,
   the sealing joint (3) providing an airtight barrier between an internal environment (MI) to be protected and an external environment (ME),
   the sealing joint (3) comprising:
   i) a bearing ring (5) that includes an external axial flange (6) and a first radial flange (6'),
   said bearing ring (5) having an outside circumference (5'),
   the first radial flange (6') having an inside edge,
   the first radial flange (6') having a face that faces toward the internal environment (MI) and a face that faces toward the external environment (ME), and
   ii) a sealing washer (7) having an outer side (7") and an inner side (7'), the inner side (7') of the sealing washer (7) being attached to the bearing ring (5) such that the sealing washer (7) surrounds the axial flange (6) on the outside circumference (5') of said bearing ring (5) and such that the sealing washer (7) extends along the face of the first radial flange (6') that faces toward the external environment (ME) in an inward direction toward the rotary shaft (2) and a part of the inner side (7') of the sealing washer (7) covers the first radial flange (6') of the bearing ring (5), the sealing washer (7) ending in a sealing lip (8) that extends beyond the inside edge of the first radial flange (6') and is supported to slide on said rotary shaft (2); and an additional ring (9) mounted integral with the rotary shaft (2), the additional ring (9) providing protection against external contaminants including dust, water, and mud, the additional ring (9) being located on the outer side of the sealing washer (7), the additional ring (9) comprising a second radial flange (10) with a first face that faces toward the internal environment (MI) and is adjacent to the sealing joint (7), and a second face that faces the external environment (ME) and is opposite to the sealing joint (7), wherein the first face (10') of the second radial flange (10) faces toward the first radial flange (6'), wherein the additional ring (9) forms, by cooperation with the first radial flange (6'), an annular structure that provides one of a baffle and a labyrinth, wherein the second radial flange (10) extends radially outward toward an inner face (4') of the opening (4), there being a gap between the additional ring (9) and the inner face (4') of the opening (4), wherein the second radial flange (10) comprises plural formations (14) on the second face that faces the external environment (ME) and that is opposite to the sealing joint (7), the plural formations (14) being provided along the second face of the second radial flange (10) as one of a relief and a recess, the plural formations (14) able to generate a stream of air during rotation of the rotary shaft (2), the generated stream of air being formed as a vortex oriented in such a way as to oppose introduction of the external contaminants in the gap between said additional ring (9) and the inner face (4') of the opening (4), wherein the first face (10') of the second radial flange (10) of the additional ring (9) faces toward the sealing joint (3) and is in sliding contact with the part of the inner side (7') of the sealing washer (7) that covers the first radial flange (6') of the bearing ring (5); and at least one of a first structure (11) and a second structure (12), wherein the first structure (11) is at least one of a relief structure and a recessed structure, wherein the first structure (11) is located on a surface of the outer side of the sealing washer (7), at the part of the inner side (7') of the sealing washer (7) that covers the first radial flange (6') of the bearing ring (5), and the first structure (11) comes into contact, under pressure, with a flat zone of the first face (10') of the second radial flange (10), wherein the second structure (12) is at least one of a relief structure and a recessed structure, and wherein the second structure (12) is located on the first face (10') of the second radial flange (10) of the additional ring (9), the second structure (12) coming into contact, under pressure, with a flat zone of outer side (7") opposite to the part of the inner side (7') of the washer (7) that covers the first radial flange (6') of the bearing ring (5).

2. The sealing device according to claim 1, including both the first structure (11) located on a surface of the outer side of the sealing washer (7), and the second structure (12) located on the first face (10') of the second radial flange (10), with the first structure (11) and the second structure (12) being located in separate, non-overlapping, annular circumferential regions, located around the rotary shaft (2).

3. The sealing device according to claim 2, wherein at least one of the first structure (11) and the second structure (12) comprise a spiral.

4. The sealing device according to claim 2, wherein at least one of the first structure (11) and the second structure (12) comprise an annular arrangement of individual blades or grooves.

5. The sealing device according to claim 2, further comprising at least one formation (16) located on the first face (10') of the second radial flange (10), the at least one formation (16) being one of a relief formation and a recessed formation, wherein the at least one formation (16) can generate, during rotation of the additional ring (9), a centrifugal air stream in an interstitial space (15) between the sealing joint (3) and the second radial flange (10) of said additional ring (9).

6. The sealing device according to claim 2, wherein the additional ring (9) forms an annular deflector, the additional ring (9) being mounted in an airtight manner on the rotary shaft (2).

7. The sealing device according to claim 1, wherein at least one of the first structure (11) and the second structure (12) comprise a spiral.

8. The sealing device according to claim 7, further comprising at least one formation (16) located on the first face (10') of the second radial flange (10), the at least one formation (16) being one of a relief formation and a recessed formation, wherein the at least one formation (16) can generate, during rotation of the additional ring (9), a centrifugal air stream in an interstitial space (15) between the sealing joint (3) and the second radial flange (10) of said additional ring (9).

9. The sealing device according to claim 1, wherein at least one of the first structure (11) and the second structure (12) comprise an annular arrangement of individual blades or grooves.

10. The sealing device according to claim 9, further comprising at least one formation (16) located on the first face (10') of the second radial flange (10), the at least one formation (16) being one of a relief formation and a recessed formation, wherein the at least one formation (16) can generate, during rotation of the additional ring (9), a centrifugal air stream in an interstitial space (15) between the sealing joint (3) and the second radial flange (10) of said additional ring (9).

11. The sealing device according to claim 1, further comprising at least one formation (16) located on the first face (10') of the second radial flange (10), the at least one formation (16) being one of a relief formation and a recessed formation,
wherein the at least one formation (16) can generate, during rotation of the additional ring (9), a centrifugal air stream in an interstitial space (15) between the sealing joint (3) and the second radial flange (10) of said additional ring (9).

12. The sealing device according to claim 1, wherein the additional ring (9) forms an annular deflector, the additional ring (9) being mounted in an airtight manner on the rotary shaft (2).

13. The sealing device according to claim 1, wherein the additional ring (9) also comprises an axial flange (13), sealed airtight around and against the rotary shaft (2), the axial flange (13) providing an axially-limited outer jacketing of the rotary shaft (2), with said axial flange (13) extending along said rotary shaft (2) beyond a plane (P') that contains the first radial flange (6') of the bearing ring (5) and forming a sliding support surface for the sealing lip (8) of the sealing washer (7).

14. The sealing device according to claim 1, wherein the plural formations (14) are distributed circumferentially on the second face of the second radial flange (10) in a homogeneous manner.

15. The sealing device according to claim 1, further comprising a conveyor structure (8') located on a face of a part of the sealing lip (8) rests in a flexible manner on one of i) the rotary shaft (2) and ii) the axial flange (13) of the additional ring (9).

16. The sealing device according to claim 1, wherein the sealing washer (7) is made of polytetrafluoroethylene and the bearing ring (5) is made of high level elastic steel.

17. The sealing device of claim 1, wherein the bearing ring (5) has an L-shaped cross-section.

18. The sealing device of claim 17, wherein the second radial flange (10) extends in a plane (P) that is parallel to another plane (P') that contains the first radial flange (6').

19. The sealing device of claim 18, wherein the first face (10') of the second radial flange (10) of the additional ring (9), facing toward the sealing joint (3), is in linear, sliding contact with the part of the inner side (7') of the sealing washer (7) that covers the first radial flange (6') of the bearing ring (5).

20. The sealing device according to claim 1, further comprising a conveyor structure (8') located on a face of a part of the sealing lip (8), the conveyor structure (8') resting in a flexible manner on one of i) the rotary shaft (2) and ii) the axial flange (13) of the additional ring (9), wherein the conveyor structure has a sawtooth profile in cross-section and includes a helical extension around a circumference of the sealing washer (8).

* * * * *